(12) United States Patent
Dey et al.

(10) Patent No.: US 10,546,509 B2
(45) Date of Patent: Jan. 28, 2020

(54) EVALUATING USER CONTRIBUTION IN COLLABORATIVE ENVIRONMENTS

(71) Applicant: International Business Machines Corporation, Armonk, NY (US)

(72) Inventors: Prasenjit Dey, Bangalore (IN); Vijay Ekambaram, Bangalore (IN); Aditya Sinha, Bangalore (IN); Mohak Sukhwani, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 268 days.

(21) Appl. No.: 15/794,439

(22) Filed: Oct. 26, 2017

(65) Prior Publication Data
US 2019/0130777 A1  May 2, 2019

(51) Int. Cl.
| | |
|---|---|
| G09B 7/02 | (2006.01) |
| G06Q 50/20 | (2012.01) |
| G09B 5/02 | (2006.01) |
| G09B 5/12 | (2006.01) |
| G09B 19/00 | (2006.01) |
| H04L 29/06 | (2006.01) |

(Continued)

(52) U.S. Cl.
CPC .............. G09B 7/02 (2013.01); G06Q 50/205 (2013.01); G09B 5/02 (2013.01); G09B 5/12 (2013.01); G09B 5/125 (2013.01); G06K 9/00302 (2013.01); G06K 9/00597 (2013.01); G09B 19/0069 (2013.01); H04L 65/403 (2013.01); H04L 67/12 (2013.01)

(58) Field of Classification Search
CPC ... G09B 7/00; G09B 7/02; G09B 5/02; G09B 5/12; G09B 5/125; G09B 19/00; G09B 19/0069; G06Q 50/205; G06Q 10/063118; G06Q 10/06131; G06Q 10/06314; G06Q 10/06315; G06Q 10/087; G06Q 10/06375; G06K 9/00302; G06K 9/00597; H04L 65/403; H04L 67/12

See application file for complete search history.

(56) References Cited

U.S. PATENT DOCUMENTS

| | | | |
|---|---|---|---|
| 10,395,187 B2 * | 8/2019 | Weyl | |
| 2004/0033475 A1 * | 2/2004 | Mizuma | G06Q 10/06 434/219 |

(Continued)

*Primary Examiner* — Timothy A Musselman
(74) *Attorney, Agent, or Firm* — Ryan, Mason & Lewis, LLP

(57) ABSTRACT

Methods, systems and computer program products for evaluating contributions in collaborative environments are provided herein. A computer-implemented method includes obtaining indications of tasks of a given workload that are completed by respective ones of a plurality of client devices. The method also includes identifying first and second tasks completed by first and second client devices at first and second times, determining whether the first task provides a clue for the second task and whether the second time is within a designated time window starting after the first time, and analyzing eye-gaze information to determine whether a second user of the second client device observed a first user of the first client device performing the first task. The method further comprises modifying contribution scores for the first and second users responsive to the determinations.

20 Claims, 14 Drawing Sheets

(51) Int. Cl.
 *H04L 29/08* (2006.01)
 *G06K 9/00* (2006.01)

(56) References Cited

U.S. PATENT DOCUMENTS

| | | | |
|---|---|---|---|
| 2008/0188777 A1* | 8/2008 | Bedziouk | ............... A61B 3/113 600/595 |
| 2015/0268857 A1 | 9/2015 | Feng | |
| 2016/0180170 A1 | 6/2016 | Auger et al. | |
| 2017/0039869 A1 | 2/2017 | Gleim et al. | |

* cited by examiner

Group of two or more client devices with displays showing a car chassis and components.

First client device drags and drops tire at correct position.

Second client device (watching first client device) drags and drops another tire at correct position.

EVALUATING USER CONTRIBUTION IN COLLABORATIVE ENVIRONMENTS

FIELD

The present invention relates to collaborative environments, and more specifically, to techniques for evaluating contributions in collaborative environments.

BACKGROUND

Collaborative environments may be used for various purposes, such as learning, design, testing, etc. Learning is an active process by which participants assimilate information. Collaborative learning can provide a number of advantages, such as promoting participant-to-participant interaction and familiarity, building self-esteem of participants, enhancing participant satisfaction with the learning experience, stimulating critical thinking, and fostering and developing interpersonal relationships among participants. Collaborative learning may use a team-based approach to problem solving while maintaining individual participant accountability.

SUMMARY

Embodiments of the invention provide techniques for evaluating participant contributions in collaborative environments.

In one embodiment, an exemplary computer-implemented method comprises obtaining, from collaborative applications running on a plurality of client devices, indications of tasks of a given workload that have been completed by respective ones of the plurality of client devices. The method also comprises identifying (i) a first task of the given workload completed by a first one of the plurality of client devices at a first time and (ii) a second task of the given workload completed by a second one of the plurality of client devices at a second time subsequent to the first time. The method further comprises determining whether the first task provides a clue for completing the second task, determining whether the second time is within a designated time window starting after the first time, and analyzing eye-gaze pattern information to determine whether a second user of the second client device observed a first user of the first client device performing the first task. The method further comprises modifying contribution scores for the first user and the second user related to the given workload responsive to determining: (i) that the first task provides a clue for completing the second task; (ii) that the second time is within the designated time window; and (iii) that the second user observed the first user performing the first task. The steps are carried out by at least one computing device.

In another embodiment, an exemplary computer-implemented method comprises providing a collaborative application to a plurality of client devices, the collaborative application being instrumented with code for capturing user interaction during performance of a given workload. The method also comprises collecting indications of actions taken by users of the client devices during performance of the given workload utilizing the collaborative application and capturing time co-occurrence of the actions taken by the users of the client devices during performance of the given workload utilizing the collaborative application. The method further comprises building a clue dependency graph by clustering the actions taken during performance of the given workload as tasks, the clue dependency graph comprising nodes representing the tasks of the given workload and directed edges connecting the tasks of the given workload to one another, each directed edge of the clue dependency graph being associated with a pair of tasks of the given workload and having a weight representing obviousness of performing a second one of the pair of tasks given observation of performance of a first one of the pair of tasks. The method further comprises generating a time dependency graph utilizing the time co-occurrence of the actions captured during performance of the given workload, the time dependency graph comprising nodes representing the tasks of the given workload and directed edges connecting the tasks of the given workload to one another, each of the directed edges of the time dependency graph being associated with a pair of tasks of the given workload and having a weight representing a designated time window for performance of a second one of the pair of tasks subsequent to performance of a first one of the pair of tasks. The method further comprises assigning contribution scores to users of the client devices for performing the tasks of the given workload utilizing the clue dependency graph and the time dependency graph. The steps are carried out by at least one computing device.

Another embodiment of the invention or elements thereof can be implemented in the form of an article of manufacture tangibly embodying computer readable instructions which, when implemented, cause a computer to carry out a plurality of method steps, as described herein. Furthermore, another embodiment of the invention or elements thereof can be implemented in the form of an apparatus including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Figure 1:
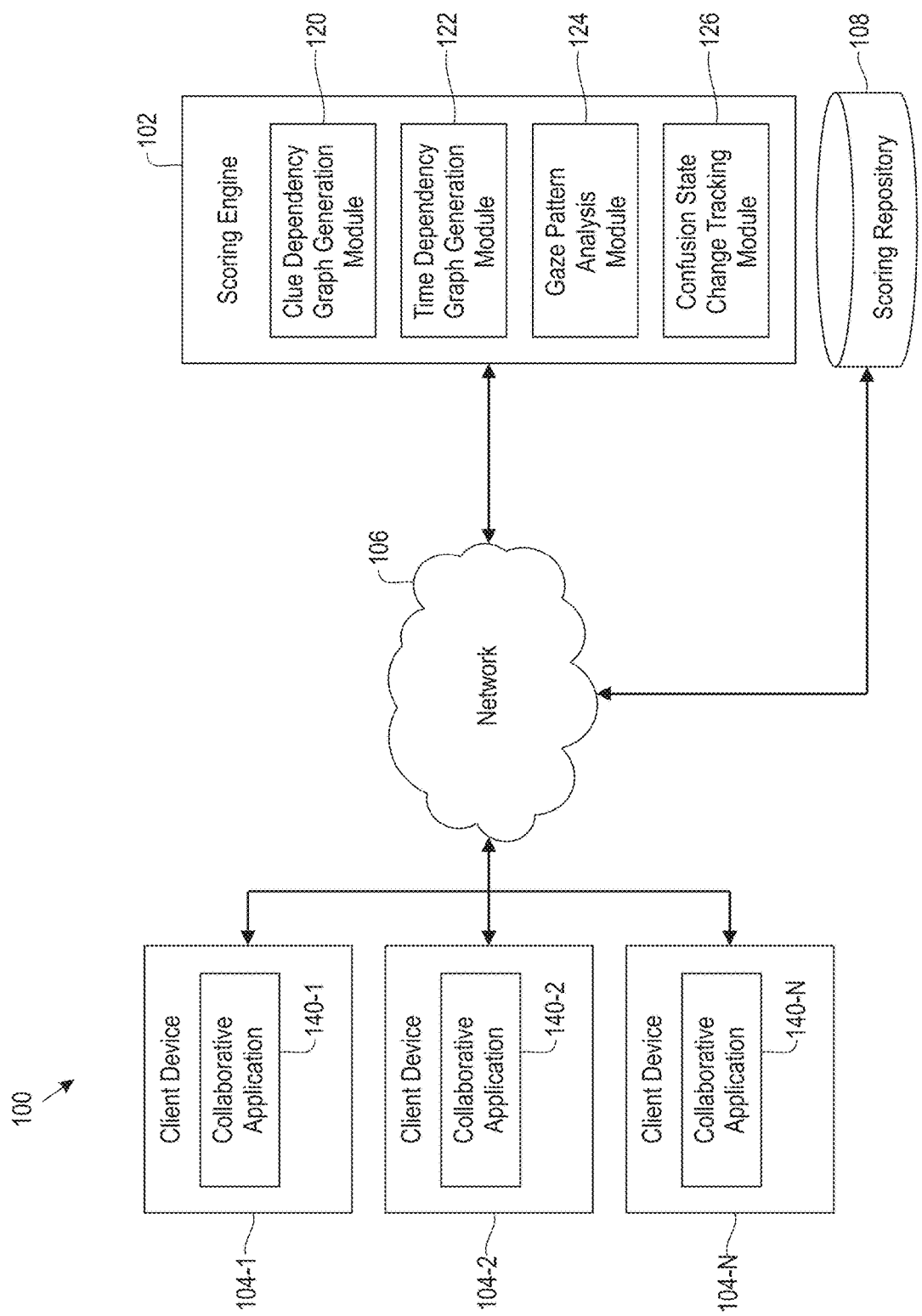
FIG. 1 depicts a system for collaborative contribution evaluation, according to an exemplary embodiment of the present invention.

Illustrative embodiments of the invention may be described herein in the context of illustrative methods, systems and devices for evaluating user or participant contributions in collaborative environments. However, it is to be understood that embodiments of the invention are not limited to the illustrative methods, systems and devices but instead are more broadly applicable to other suitable methods, systems and devices.

As discussed above, collaborative environments may be used for various purposes including but not limited to learning, design, testing, problem solving, etc. Collaborative environments, however, are not without challenges. One challenge for collaborative environments is in evaluating the contributions of different participants. In collaborative learning environments, for example, it may be difficult to fairly evaluate the participation by and contributions of different students. Students in a collaborative learning environment may work together to solve a problem, wherein a first student may provide a correct solution or answer to the problem based on clues or other contributions provided by other students. Conventional collaborative learning systems may not provide adequate mechanisms for fairly evaluating the contributions of the other students providing the clues that the first student utilizes in providing the correct solution or answer to the problem.

Illustrative embodiments utilize augmented reality (AR) in collaborative environments to enable an evaluation methodology for fairly evaluating contributions of participants. While various embodiments are described below with reference to collaborative learning environments, it is to be appreciated that embodiments are not limited solely to use in collaborative learning environments but instead may be used in various other types of collaborative environments including but not limited to those for training, product evaluation, product or other customer support, product or system design, testing, evaluation, etc.

In some embodiments, an evaluation framework is provided to assess the contributions of different participants towards a goal or objective. In a collaborative learning ecosystem, for example, the evaluation framework may be used to assess different students' respective contributions to solving a problem. In a customer support system, as another example, the evaluation framework may be used to assess the contributions of different customer support representatives towards solving a customer issue (e.g., a support call, a problem ticket, etc.).

Collaborative learning systems may be used in place of or to supplement ordinary classroom teaching. Classroom teaching may suffer from disadvantages, such as student reluctance to interact with a teacher, classroom anxiety, self-centered approaches, etc. Collaborative learning can obviate or mitigate some or all of these and other disadvantages, in promoting the sharing of ideas, collaboration, discussion, brainstorming and constructivist approaches for student learning. In co-located collaborative learning environments, wherein multiple students are in the same location, further advantages are realized, such as in permitting real-time feedback, highly interactive learning, and in the use of ubiquitous technology for student engagement. Technology which may be utilized in co-located collaborative learning environments includes, by way of example, smartphones, tablets, laptops, desktops, etc.

While co-located collaborative learning provides many advantages, it also presents challenges. As described above, in collaborative learning environments it can be difficult to obtain individualistic contribution evaluations for different students, which may be used for various purposes such as in generating student grades, assessing the effectiveness of the collaborative learning tasks or lessons, etc. Similar challenges are presented in other types of collaborative environments.

As discussed above, challenges include how to effectively utilize technology such as AR to foster collaborative environments, how to assess participant effort or contribution, and how to fairly evaluate participant contribution in a group activity. Fairly evaluating participant contribution may include considering hints or clues provided by other participants, as well as determining whether one participant merely copied another participant's work. Techniques are needed to understand the tasks involved in a given workload (e.g., such as a problem or question to be answered in a collaborative learning environment), as well as how such tasks are related to one another. Relations between tasks may be time-based or clue-based (e.g., some tasks may provide hints or clues to subsequent tasks in a workload). An evaluation framework should thus understand if a given task completed by a given participant is based on a hint or clue provided by another task previously completed by another participant.

Some embodiments provide an evaluation framework that fairly assesses contributions of different participants to a given workload. The evaluation framework may use a scoring engine that detects clue dependencies between tasks of the given workload as well as the obviousness of clue exposure between independent tasks in the given workload (e.g., based on action-step correlations and co-occurrence of tasks). The scoring engine is thus able to assign fair evaluation scores, marks or other measures of contribution for participants based on how clues were actually leveraged at run-time. In some embodiments, the scoring engine may utilize a hybrid fusion of inference from a clue dependency graph, a time dependency graph, a confusion state change model, and eye-gaze interaction metadata.

Some approaches for evaluating participant contribution in a collaborative environment utilize rules-based systems. A rules-based system, for example, may be based on determining whether different tasks in a workload are accomplished, with different tasks being assigned different priorities or weights. Participants are thus rewarded by accomplishing tasks, with the amount of the reward being based at least in part on the priority or weight assigned to the respective tasks. As mentioned above, however, in some workloads, tasks are related to one another as clues. A first task, for example, may provide a clue for how to accomplish a second task. While the second task may be more difficult than the first task, the clue provided by the first task results in less effort required to accomplish the second task. To fairly evaluate contribution, a participant whose contributions are attributable at least in part to clues provided by other participants should have his or her score reduced or otherwise modified to indicate the clues provided by the other participants.

An evaluation framework used in some embodiments may be designed to track clue-dependency between tasks in a workload, and to track the time to solve different tasks. The gaze behavior of participants may also be monitored by collaborative applications running on client devices utilized by the participants, possibly utilizing AR technology. Application usage patterns are recorded to track the gaze behavior. The evaluation framework can thus establish a score or other measure of a participant's contribution wherein: (1) a participant's score is reduced for accomplishing a given task if the recorded gaze patterns indicate that the participant relied on a clue from another participant; (2) a participant's score is based at least in part on how quickly a task is accomplished, relative to some baseline or measure provided by a time dependency graph; and (3) a participant's score for accomplishing a task is based on determining which tasks are clue-dependent and also based on the obviousness of clues (e.g., based on a clue dependency graph).

FIG. 1 shows a collaborative system 100, including a scoring engine 102 coupled to client devices 104-1, 104-2, . . . , 104-N (collectively, client devices 104) over network 106. The network 106 may be any one of or a combination of different network types.

The scoring engine 102 includes a clue dependency graph generation module 120, a time dependency graph generation module 122, a gaze pattern analysis module 124 and a confusion state change tracking module 126. These modules provide functionality, which will be described in further detail below with respect to FIGS. 2-10, for generating participant contribution scores.

The scoring engine 102 in collaborative environment 100 is further coupled to a scoring repository 108, which may store information relating to different types of collaborative environments, participants, workloads, tasks, clues, gaze patterns, confusion states, etc. used in generating participant contribution scores. Although FIG. 1 shows an example wherein the scoring engine 102 is coupled to the scoring repository 108 via network 106, this is not a requirement. In other embodiments, the scoring engine 102 may be connected directly to the scoring repository 108, or the scoring repository 108 may be implemented at least partially internal to the scoring engine 102.

The client devices 104-1, 104-2, . . . , 104-N implement respective collaborative applications 140-1, 140-2, . . . , 140-N (collectively, collaborative applications 140). Each of the collaborative applications 140 may be configured for use by one or more users of the client devices 104. In some embodiments, each user or participant in a collaborative environment is associated with a distinct one of the client devices 104. In other embodiments, two or more participants may share access to a single one of the client devices 104. The collaborative applications 140 are configured to present a workload with tasks to be completed by participants of the collaborative environment 100.

In some cases, the collaborative applications 140 are interconnected with one another, such as via one or more application programming interfaces (APIs), such that the participants collectively view a same display on their respective client devices 104. For example, participant action (such as dragging and dropping an item or other activation of a user interface element) on one of the collaborative applications 140 causes other instances of the collaborative applications 140 to update their respective displays in response. In other cases, the displays provided by the different collaborative applications 140 may be independent, in that actions taken by a participant in one of the collaborative applications 140 on one of the client devices 104 do not affect the displays provided by other collaborative applications 140 on other ones of the client devices 104. Various other arrangements are possible, including combinations wherein different collaborative applications 140 are partially interdependent on one another and also partially independent (e.g., certain user interface features may cause updates to only one of the collaborative applications while other user interface features may cause updates to multiple collaborative applications).

In some embodiments, the client devices 104 may be arranged in different groups. For example, different groups of client devices 104 may form distinct collaborative sub-environments within the overall collaborative environment 100. Such different groups may each be assigned a same workload, where participants utilizing the different groups of client devices 104 may compete to accomplish the tasks in the workload fastest. In other embodiments, different groups of client devices 104 may be assigned to complete different workloads, or different tasks or groups of tasks forming a single workload.

In some cases, collaborative applications 140 may provide respective AR applications, providing participants which utilize different ones of the client devices 104 with access to a common, shared virtual environment.

The collaborative applications 140 may access various information stored in the scoring repository 108, and may provide information relating to workloads, tasks, clues, gaze patterns, confusion state changes, etc. for storage in the scoring repository 108 or directly to the scoring engine 102. The clue dependency graph generation module 120, time dependency graph generation module 122, gaze pattern analysis module 124 and confusion state change tracking module 126 utilize such information in generating contribution scores for the participants utilizing the client devices 104.

The clue dependency graph generation module 120 builds clue dependency graphs for different workloads based on action-step semantic correlations across tasks and time co-occurrence indexes derived during a training phase. A collection of action-steps and co-occurrence indexes is generated, at a task level, during the training phase. Applications, such as the collaborative applications 140 used in the collaborative environment 100, are instrumented with test-case generation code libraries. The code libraries capture events during user interaction, and output formatted action-steps during task execution. In some embodiments, the action-steps are output in a natural language format, such as an English-language format. The instrumented collaborative applications are provided to experts in the training phase, and the experts complete tasks and workloads (e.g., collaborative games or other collections of tasks). The action-steps taken by the experts are collected and clustered based on the various tasks to be performed as part of the workload. The time co-occurrence of such tasks are also captured based on the number of instances when two or more tasks co-occur with a short time difference (e.g., a time difference less than some designated threshold).

Each task in a workload may be represented as a node. Directed edges between nodes indicate clues. For example, a directed edge between a node A and a node B indicates that execution of the task represented by node A gives a clue for execution of the task represented by node B. Edges between nodes may be assigned weights representing the obviousness of the clues. Edge discovery and weight assignment, in some embodiments, is based on a first parameter characterizing semantic correlation of action-steps between two tasks and a second parameter characterizing the number of instances when the two tasks co-occurred within a short time span or with a short time difference.

Figure 2:
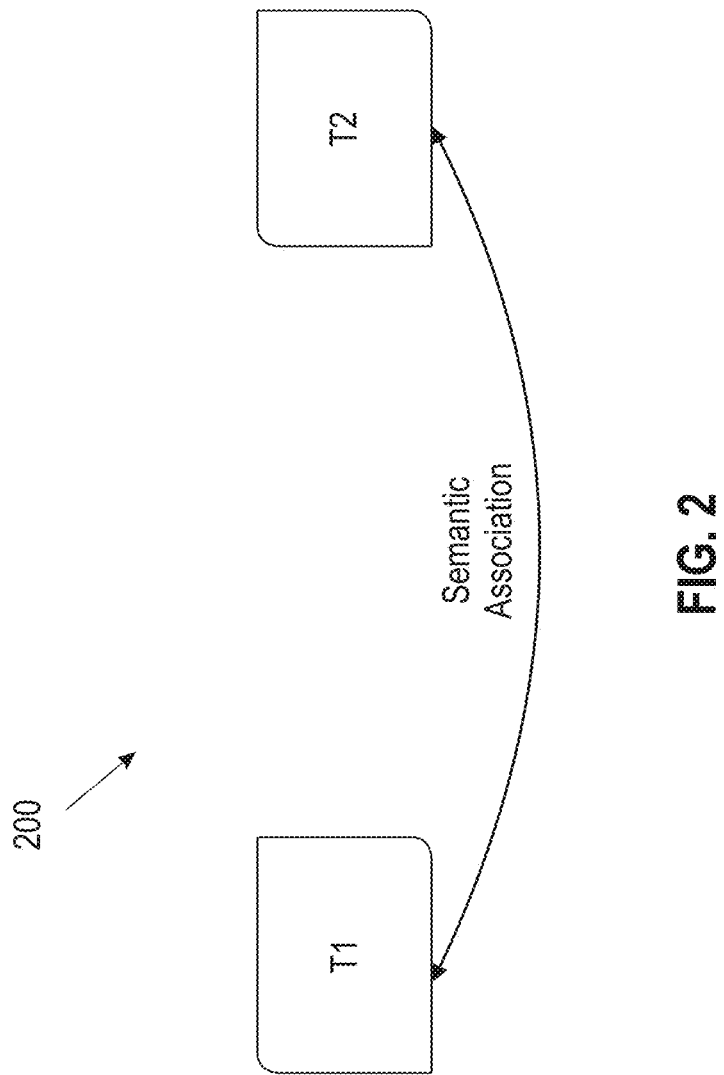
FIG. 2 depicts a semantic association between clues, according to an exemplary embodiment of the present invention.
Figure 3:
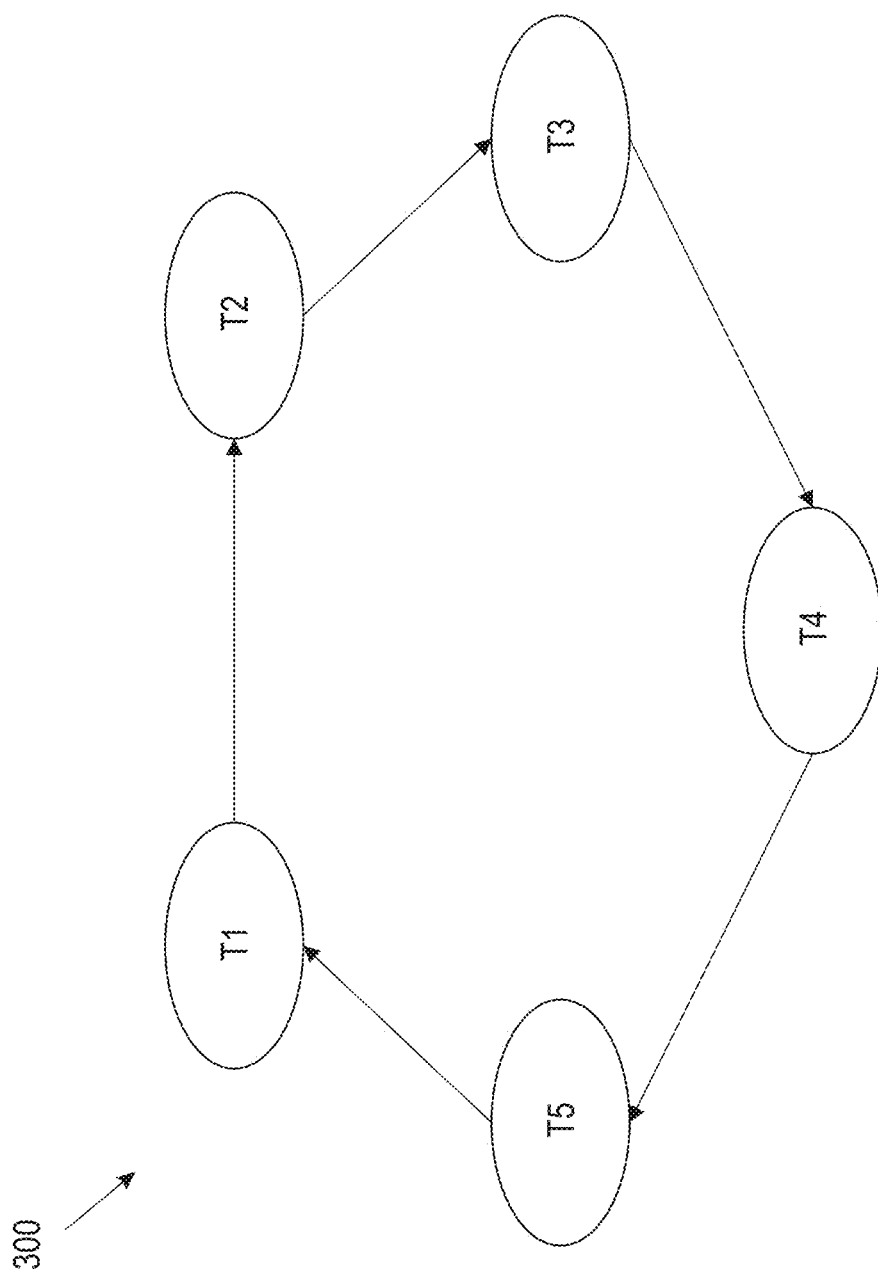
FIG. 3 depicts a clue dependency graph, according to an exemplary embodiment of the present invention.

FIG. 2 represents a semantic association 200 between a first task T1 and a second task T2, which may form a portion of a clue dependency graph generated by the clue dependency graph generation module 120. In some embodiments, the weight assigned to the edge between the nodes representing T1 and T2 leads to an inverse relationship with contribution score (e.g., the higher the edge weight the lower the contribution score). Action steps of each task are thus represented in a common way, with the semantic association between action-steps or tasks determined based at least in part on data obtained during a training phase as described above. FIG. 3 represents a clue dependency graph 300 with nodes for five tasks denoted T1 through T5, with directed edges connecting the tasks.

Figure 4:
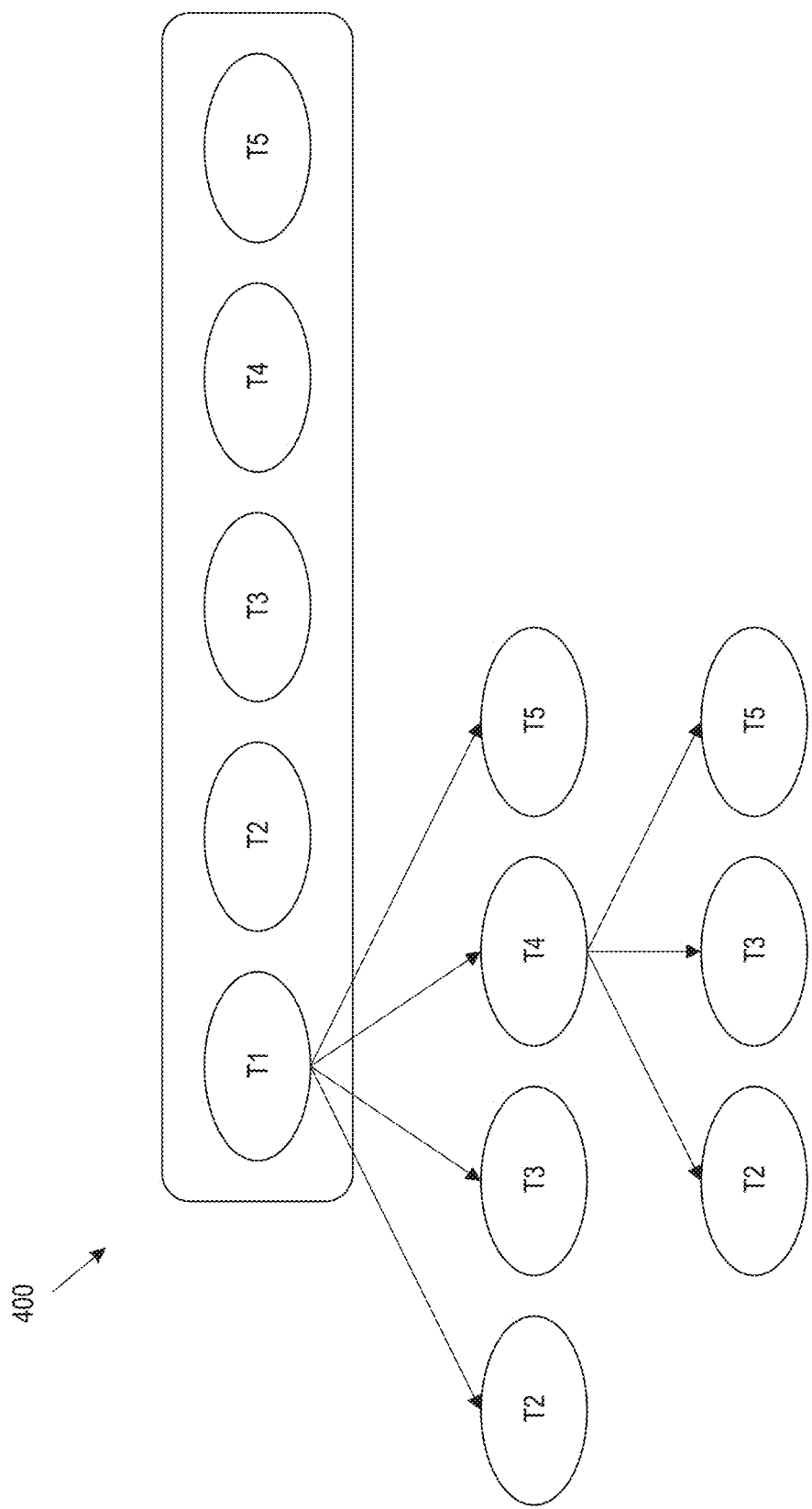
FIG. 4 depicts a time dependency graph, according to an exemplary embodiment of the present invention.

The time dependency graph generation module 122 is configured to generate time dependency graphs for use in computing participant contribution scores. FIG. 4 shows an example of a time dependency graph 400 for tasks T1-T5. In the time dependency graph 400, the contribution score increases as the time taken decreases. A formula for computing a participant contribution score based on time dependency and clue dependency graphs is as follows:

$$\text{Score} = (1 - t/T) * M * \Pi(w_{ij}) \quad (1)$$

where M denotes maximum marks (e.g., a highest participant contribution score), t denotes a time taken to solve a task, T denotes a late threshold time (e.g., after the late threshold time the system randomly solves one of the remaining tasks), E denotes an early threshold time (e.g., if tasks are solved less than this time, the weights are readjusted), and $w_{ij}$ denotes a weight between nodes representing different tasks.

Figure 5:
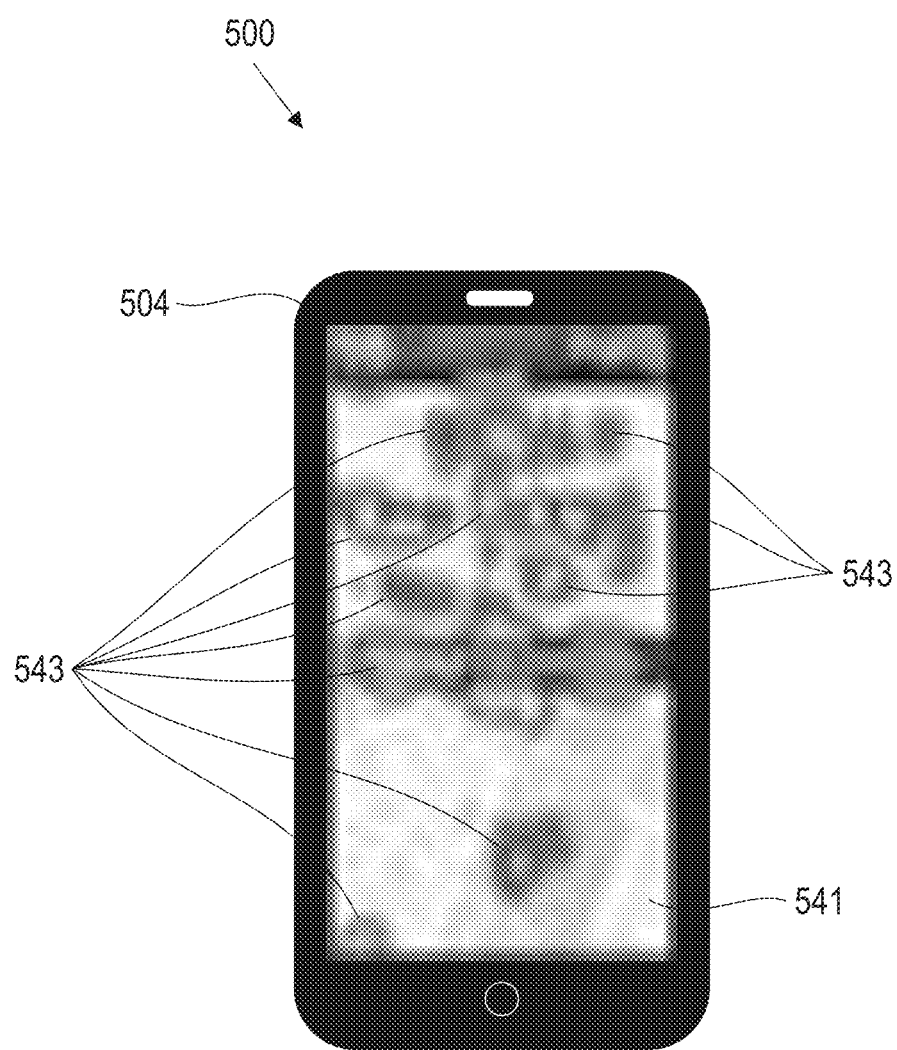
FIG. 5 depicts a gaze pattern, according to an exemplary embodiment of the present invention.

The gaze pattern analysis module 124 analyzes gaze patterns of participants utilizing the collaborative applications 140 on the client devices 104. FIG. 5 shows an example of a gaze pattern detection 500 on a client device 504 with display 541. The gaze pattern analysis module 124 may generate a gaze heat map of locations 543 on the display 541 which the participant utilizing client device 504 looks at while completing tasks of a workload. Gaze pattern information, such as the locations 543, may be obtained utilizing cameras or other image sensors.

Figure 6:
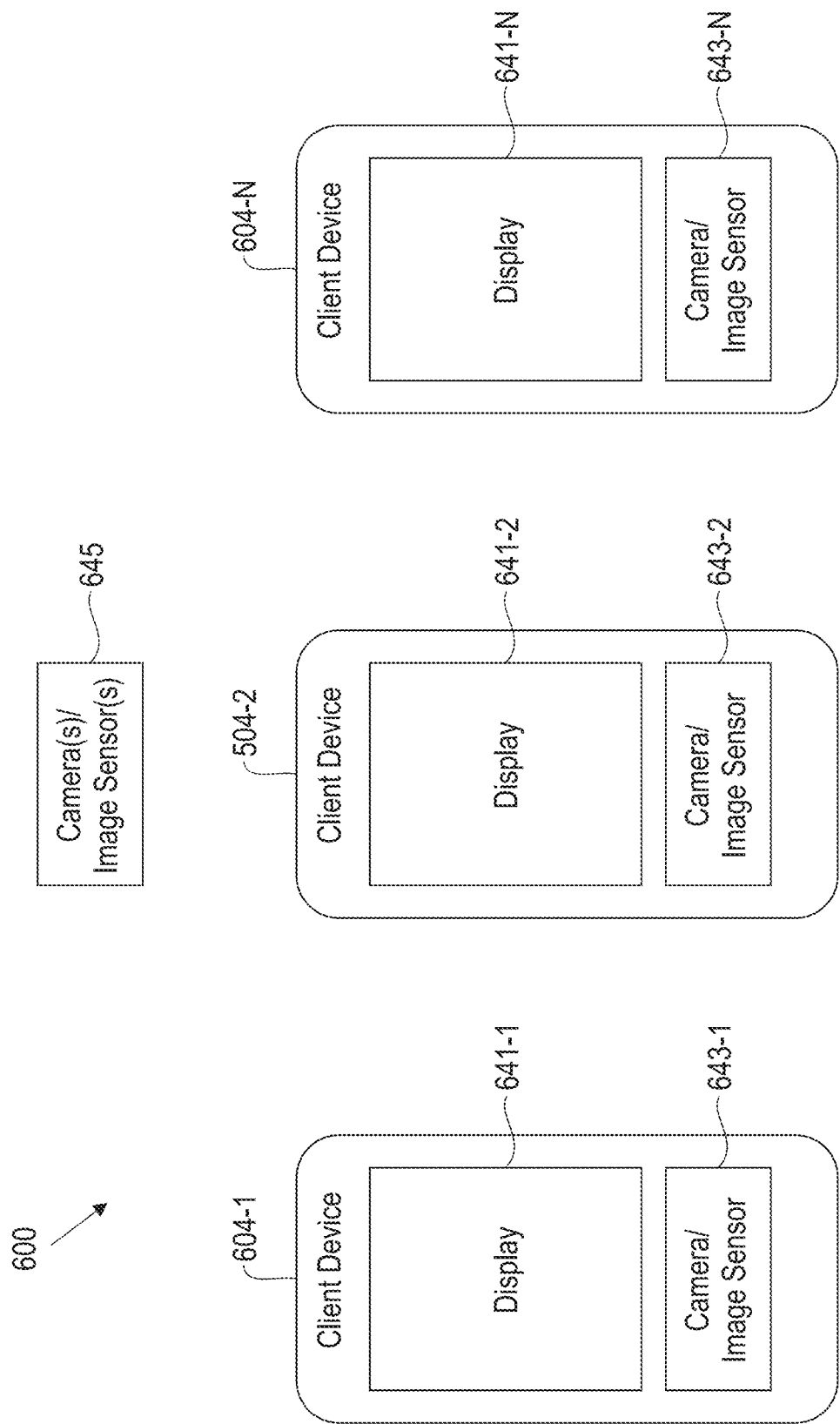
FIG. 6 depicts camera and image sensors in a co-located system for collaborative contribution evaluation, according to an exemplary embodiment of the present invention.

FIG. 6 shows a collaborative environment 600 with a plurality of client devices 604-1, 604-2 . . . , 604-N (collectively, client devices 604). Each of the client devices 604 includes a corresponding display and one or more cameras or other image sensors, e.g., client device 604-1 includes display 641-1 and camera/image sensor 643-1, client device 604-2 include display 641-2 and camera/image sensor 643-2, and client device 604-N includes display 641-N and camera/image sensor 643-N. The displays 641-1, 641-2, . . . , 641-N are collectively referred to as displays 641, and the cameras/image sensors 643-1, 643-2, . . . , 643-N are collectively referred to as cameras/image sensors 643.

The cameras/image sensors 643 are configured to track the gaze of participants utilizing the client devices 604. For example, one or more of the cameras/image sensors 643 may comprise a front-facing camera on a front of one of the client devices 604, placed above, below, around and/or behind a corresponding display 641 that captures video and/or images used to track eye movement. One or more of the cameras/image sensors 643 may alternatively be a sensor, such as an electrooculogram (EOG) sensor to capture signals for detecting eye movement. In some embodiments, one or more of the client devices 604 may include multiple different cameras or other sensors used to track eye movement. As mentioned above, some embodiments may utilize AR wherein collaborative applications running on client devices provide access to a shared virtual environment. AR may, in some instances, be implemented using goggles or other three-dimensional (3D) AR equipment worn by a participant. In such cases, the image sensors 643 may alternatively or additionally include motion sensors such as accelerometers, gyroscopes, etc. configured for measuring movement of the participant's head as the tasks of the workload are completed.

Further, as shown in FIG. 6, the collaborative environment may include one or more cameras or image sensors 645 external to the client devices 604 configured to record images, video or other signals for detecting eye movement or other motion or movement for measuring gaze of participants utilizing the client devices 604. Gaze pattern information may take the form of eye-gaze interaction metadata correlated with event quadrants or other defined regions of a display 641 of a client device 604. A collaborative application running on the client device 604 may dynamically map event quadrants or regions of the display 641 based on the particular workload, progress of tasks of the workload, etc.

Information from the cameras and image sensors 643 and 645 may, in some embodiments, be further or alternatively utilized by the confusion state change tracking module 126 to capture or determine the "confusion state" of the participants, such as in capturing and analyzing facial expressions or other participant interaction with the client devices 104/604 while the participants complete tasks of a given workload. Tracking confusion state change may utilize facial expressions or other interaction patterns of the participants to judge the mood of a user, the engagement of a user, etc.

Interaction patterns include measuring changes in participant input to user interface features of the collaborative applications 140, such as a change in the frequency, duration or force of input to a touchscreen, keys of a keyboard, or other buttons or activatable user interface features provided by client devices 104. Such information may be used to determine the mood of the participant, which may be used to determine whether the user is becoming frustrated, providing random input, etc., indicative of confusion or lack of understanding of the action-steps being taken (e.g., a participant that is frustrated may try selecting different possible action-steps at random until finding success). The interaction patterns may also be used to determine hesitancy or surety behind participant action (e.g., indicative of whether a participant is copying from another participant or is learning on his/her own). Various other examples are possible.

Confusion state of a user can be determined in various ways, such as in using facial expression and touch or other user-input interaction analysis as discussed above. For example, in touch interaction based analysis, a lot of hand hovering (e.g., an amount of hand hovering over some designated threshold) may be associated with or otherwise be indicative of a confusion state. Similarly, taking relatively more time for performing actions (e.g., based on some baseline threshold) may be associated with or otherwise indicative of a confusion state. For facial expression analysis, various models may be used to detect confusion state. In some cases, a lot of eyeball movements (e.g., eyeball movement over some designated threshold) is a parameter that is associated with or otherwise indicative of a confusion state.

Figure 7:
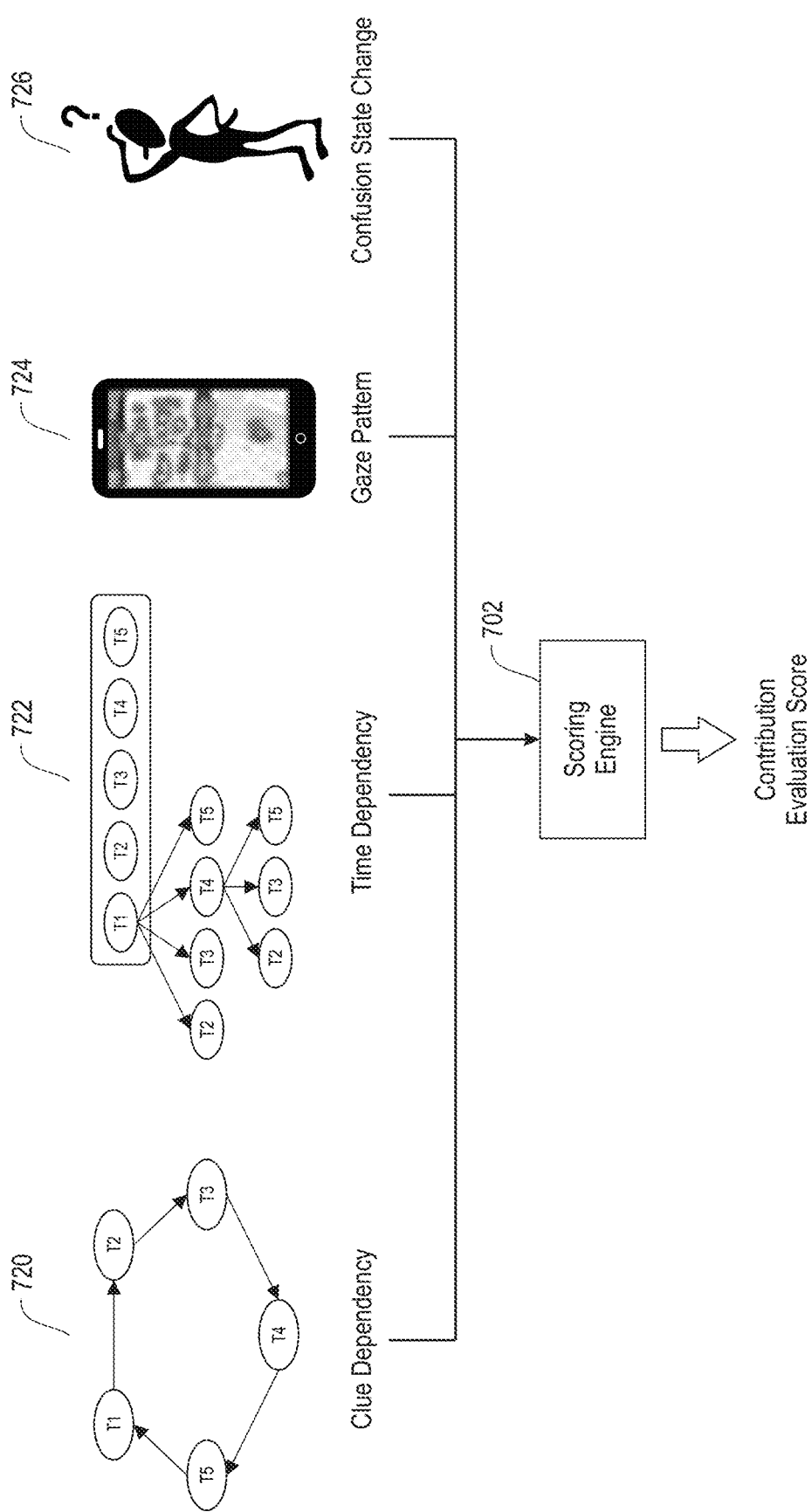
FIG. 7 depicts generation of a contribution evaluation score, according to an illustrative embodiment of the present invention.

FIG. 7 depicts generation of a contribution evaluation score in a collaborative environment 700 including a scoring engine 702. The scoring engine 702 receives a clue dependency graph 720 (which may be generated as described above utilizing clue dependency graph generation module 120), a time dependency graph 722 (which may be generated as described above utilizing time dependency graph generation module 122), gaze pattern information 724 (which may be generated as described above utilizing gaze pattern analysis module 124) and confusion state change information 726 (which may be generated as described above utilizing confusion state change tracking module 126). The scoring engine 702 uses all or some portion of this input to generate contribution evaluation scores for participants.

In some embodiments, the scoring engine 702 provides for fair evaluation through the hybrid fusion of clue dependency graph 720, time dependency graph 722, gaze pattern information 724 and confusion state change information 726.

Consider two tasks, a first task X performed by participant X' and a second task Y performed by participant Y'. The scoring engine 702 utilizes the time dependency graph 722 to determine whether the tasks X and Y co-occur within a short time span (e.g., within some designated time threshold or time window starting after completion of task X specified in the time dependency graph 722 for nodes representing tasks X and Y). If the tasks X and Y co-occur within a short time span as determined utilizing the time dependency graph 722, the scoring engine 702 checks the clue dependency graph 720 to determine if there is a strong directed edge between task X and task Y (e.g., whether the weight assigned to a directed edge connecting nodes representing task X and task Y meets specified threshold conditions). If the scoring engine 702 determines that the strong directed edge exists utilizing the clue dependency graph 720, the scoring engine 702 checks the gaze pattern information 724 to determine whether participant Y' used a clue from participant X' (e.g., whether the eye-gaze metadata of participant Y' indicates that participant Y' observed the event of task X being performed by participant X').

Responsive to determining that participant Y' used a clue from participant X', the contribution evaluation scores are modified. The contribution evaluation score for the participant receiving the clue (e.g., participant Y') is decreased while the contribution evaluation score for the participant providing the clue (e.g., participant X') is increased. In some embodiments, the modification of the contribution evaluation scores is zero-sum (e.g., a decrease of Z points to the score of participant Y' is paired with an increase of Z points to the score of participant X'). In other embodiments, the modification of the contribution evaluation scores need not be zero-sum.

Consider a first participant that may receive multiple clues from other participants in a collaborative environment. In some cases, the "penalty" or negative adjustment in contribution evaluation score for the first participant increases or is weighted to the number of clues used by the first participant. As an example, use of one clue may result in a 5% decrease in the contribution evaluation score, use of two clues may result in a 10% decrease in the contribution evaluation score, use of three clues may result in a 20% decrease in the contribution evaluation score, etc. In other cases, the penalty is based on the weight of the clues utilized. For example, stronger or more obvious clues may result in larger penalties while more subtle clues result in smaller penalties. Similarly, the "bonus" or positive adjustment in contribution evaluation score may vary based on a number of factors, such as the weight of the clues provided, the number of other participants which utilize clues provided, time taken between tasks, etc. Various other arrangements are possible, including combinations of the above.

In some embodiments, as discussed above, collaborative environments may be real-time replicated across client devices, such that each action taken by a participant is reflected in the displays of collaborative applications of client devices utilized by other participants in the collaborative environment (or some subset of the client devices in the collaborative environment organized into a group). Based on this real-time replication, the scoring engine 702 in some embodiments is able to detect whether participants observed action-steps performed by other participants by correlating participant eye-gaze data with a screen quadrant or other region of a display where such action-steps were taken. The scoring engine 702 may further utilize confusion state change information 726 (e.g., facial expressions, interaction patterns, etc.) to detect changes in participant's confusion state also useful for determining reliance on clues as discussed above.

Figure 8:
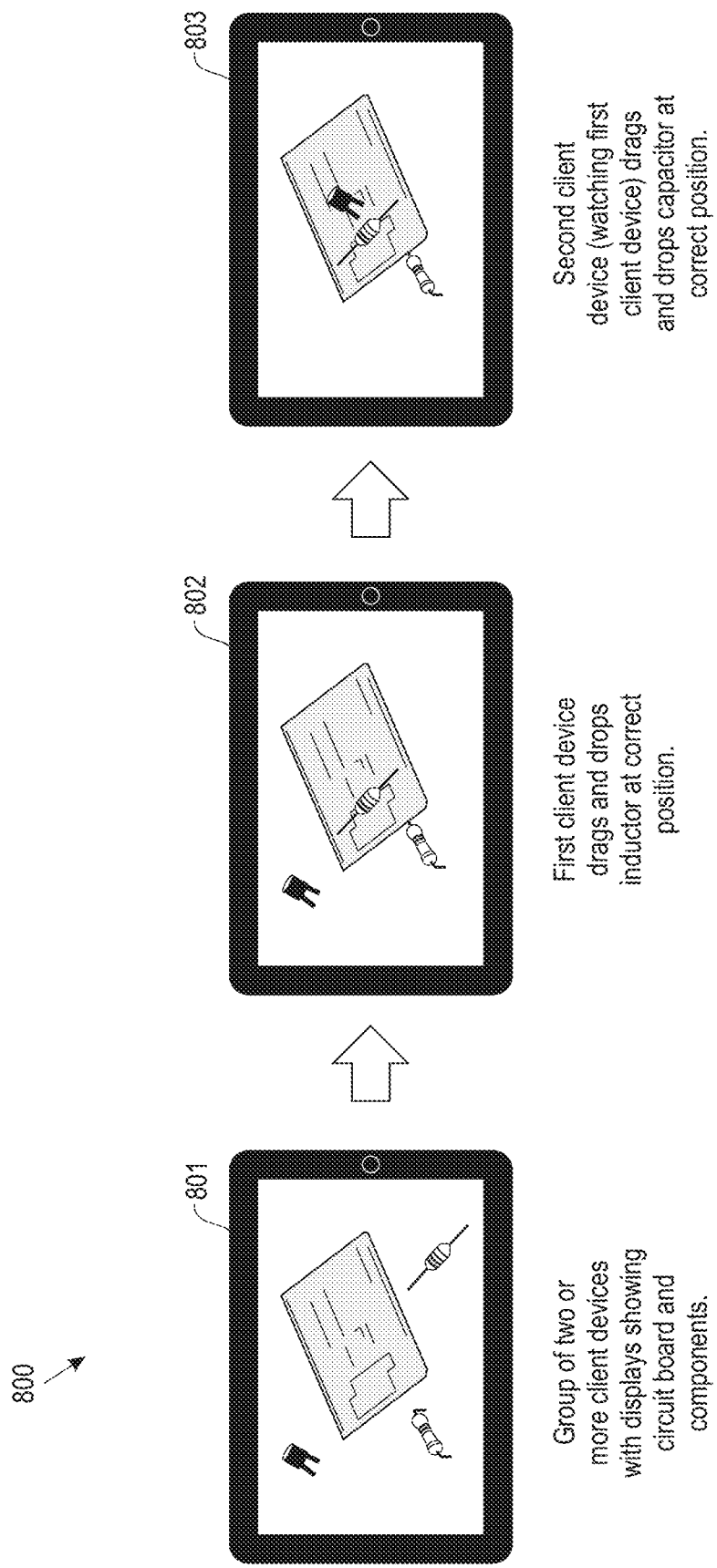
FIG. 8 depicts an example of learning in a collaborative environment, according to an illustrative embodiment of the present invention.
Figure 9:
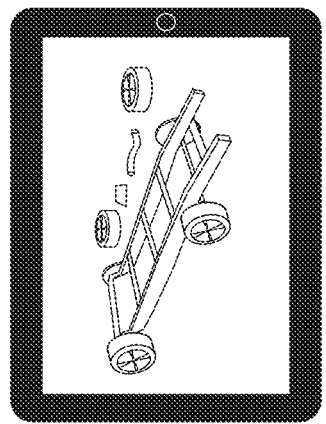
FIG. 9 depicts another example of learning in a collaborative environment, according to an illustrative embodiment of the present invention.
Figure 9:
Figure 9:
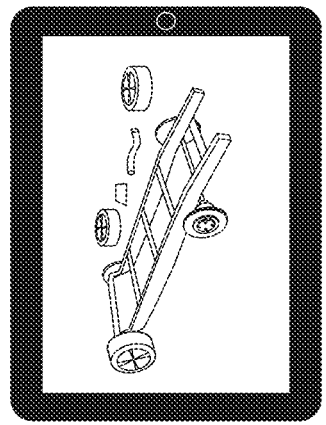
Figure 9:
Figure 9:
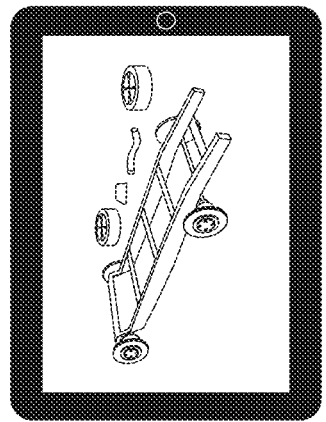

FIGS. 8 and 9 depict examples of collaborative learning environments, and tasks or action-steps that form part of a workload or problem to be solved. In the collaborative learning environments of FIGS. 8 and, 9, it is assumed that a group of students (e.g., participants) is asked by a teacher to solve a problem, and that the students can collaborate and view each other's changes or action-steps taken on respective smartphone or tablet devices (e.g., client devices) in real-time.

In the FIG. 8 collaborative learning environment 800, the teacher asks the students to create an LCR circuit utilizing collaborative applications running on their respective client devices. In step 801, each of the students (via his or her respective client device) is presented with a display of a circuit board and the components needed to create the LCR circuit. In step 802, a first student via a first client device drags and drops an inductor (L) at the correct place on the circuit board for forming the LCR circuit. In step 803, a second student via a second client device observes the hint or clue provided by the first student and drags and drops the capacitor (C) at the correct place on the circuit board for forming the LCR circuit.

A scoring engine such as scoring engine 102/702 utilizes gaze pattern information to identify that the second student observed the first student placing the inductor at the correct location. The scoring engine 102/702 utilizes a clue dependency graph to determine that there is a link between the tasks of placing the inductor and placing the capacitor, and further checks a time dependency graph to determine whether the second student's action in step 803 took place within a designated threshold time of the first student's action in step 802. If these conditions are found, then the scoring engine 102/702 will modify the contribution evaluation scores of the first student and the second student accordingly.

In the FIG. 9 collaborative learning environment 900, the teacher asks the students to assemble a car utilizing collaborative applications running on their respective client devise. In step 901, each of the students (via his or her respective client device) is presented with a display of a car chassis and various car components. In step 902, a first student via a first client device drags and drops a first tire at the correct position on the car chassis. In step 902, a second student via a second client device observes the hint or clue provided by the first student and drags and drops a second tire at a correct location on the car chassis.

A scoring engine such as scoring engine 102/702 utilizes gaze pattern information to identify that the second student observed the first student placing the first tire at the correct location. The scoring engine 102/702 utilizes a clue dependency graph to determine that there is a link between the tasks of placing the first tire and placing the second tire, and further checks a time dependency graph to determine whether the second student's action in step 903 took place within a designated threshold time of the first student's action in step 902. If these conditions are found, then the scoring engine 102/702 will modify the contribution evaluation scores of the first student and the second student accordingly.

Figure 10:
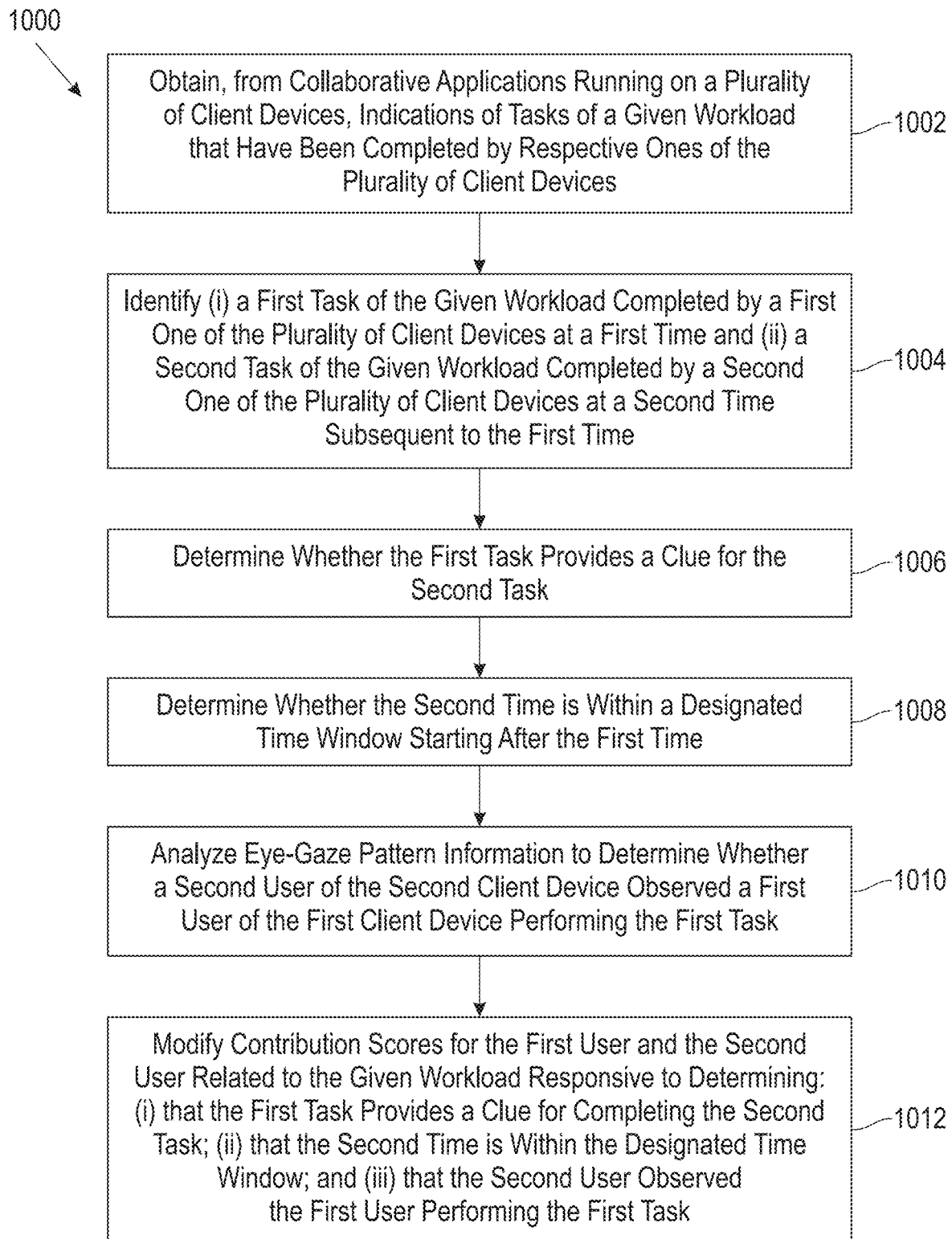
FIG. 10 depicts a run-time phase of a process for evaluating contribution in a collaborative environment, according to an exemplary embodiment of the present invention.

FIG. 10 depicts a process 1000 for evaluating contribution in a collaborative environment. The process 1000 may be performed utilizing the scoring engine 102/702 described above. In some embodiments, the collaborative environment includes one in which actions taken by a user or participant in a collaborative application running on one of a plurality of client devices are real-time replicated in collaborative applications running on other ones of the plurality of client devices. The process 1000 may be used in a wide variety of usage scenarios, such as one in which a plurality of client devices implement a collaborative learning environment and the workload comprises a problem to be completed by students using the plurality of client devices. In another usage scenario, a plurality of client devices implement a collaborative support environment and the workload comprises a support ticket or other type of service call or inquiry that is to be completed by support representatives utilizing the plurality of client devices.

The process 1000 more particularly details a run-time phase of a process for evaluating participant contributions in a collaborative environment. The run-time phase may initiate after a training phase as described herein, wherein collaborative applications are instrumented with test code for building clue dependency graphs, time dependency graphs, etc. for different workloads. An example of a training phase process will be discussed in further detail below with respect to FIG. 11.

The process 1000 begins with step 1002, where indications of tasks of a given workload that have been completed by respective ones of a plurality of client devices are obtained from collaborative applications running on a plurality of client devices. In step 1004, first and second tasks of the given workload are identified. The first task is one that is completed by a first one of the client devices at a first time, and the second task is one that is completed by a second one of the client devices at a second time subsequent to the first time.

In step 1006, it is determined whether the first task provides a clue for the second task. Step 1006 may utilize a clue dependency graph for the given workload. The clue dependency graph, as discussed above, may comprise nodes representing the different tasks of a given workload, with directed edges connecting the tasks of the given workload to one another. The directed edges have weights, which represent the obviousness of clues. For example, a given directed edge connecting the first task to the second task indicates that the first task provides a clue for execution of the second task, with the weight assigned to the given directed edge representing the obviousness of the clue provided by observation of the first task.

In step 1008, it is determined whether the second time is within a designated time window starting after the first time, also referred to herein as a designated time threshold of the first time. Step 1008 may utilize a time dependency graph for the given workload. The time dependency graph has nodes representing tasks of the given workload and directed edges connecting the tasks of the given workload to one another. The directed edges represent designated time windows for completing tasks. For example, a given directed edge connecting the first task to the second task indicates that the second task is performed subsequent to the first task, with a weight assigned to the given directed edge representing the designated time window starting after completion of the first task. It is to be appreciated that, in a time dependency graph, different designated time windows may be used for different pairs of tasks. In some cases, a higher weight assigned to a directed edge indicates a shorter designated time window.

In step 1010, eye-gaze pattern information is analyzed to determine whether a second user of the second client device observed a first user of the first client device performing the first task. The eye-gaze pattern information may comprise metadata or other information that correlate performance of actions with eye-gaze information indicating a region of the screen or display of a client device that a user is looking at while performing the actions. The eye-gaze pattern information may be captured using image sensors or cameras of the client devices themselves, or by external image sensors or cameras.

In some embodiments, step 1010 further comprises tracking user confusion state changes as the plurality of client devices perform the tasks of the given workload, wherein the user confusion state changes are utilized in determining whether the second user of the second client device observed the first user of the first client device performing the first task. Tracking user confusion state changes may comprise analyzing interaction patterns of users of the plurality of client devices and/or analyzing facial expressions of users of the plurality of client devices.

The process 1000 concludes with step 1012, modifying contribution scores for the first user and the second user related to the given workload responsive to the determinations in steps 1006, 1008 and 1010. In some embodiments, step 1012 includes increasing a contribution score for the first user by a first designated amount and decreasing a contribution score for the second user by a second designated amount. The first and second designated amounts may be the same or different. In some embodiments, the first and/or second designated amounts may be based on obviousness of the clue for the second task that is provided by the first task (e.g., based on the weight of the directed edge in a clue dependency graph which connects nodes representing the first and second tasks). In some embodiments, the first and second designated amounts may also or alternatively be based on a length of time between performance of the first task and performance of the second task.

Figure 11:
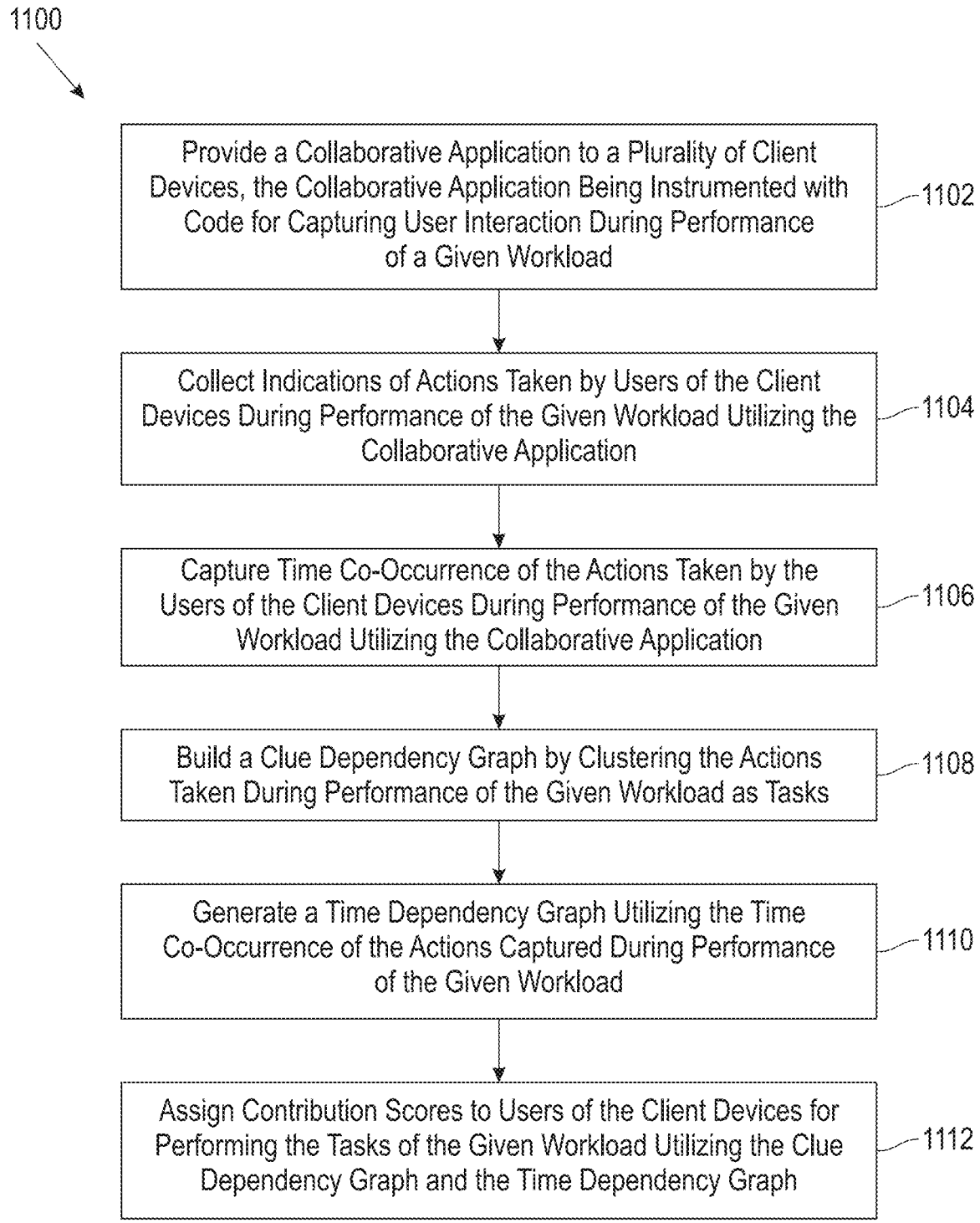
FIG. 11 depicts a training phase of a process for evaluation contribution in a collaborative environment, according to an exemplary embodiment of the present invention.

FIG. 11, as mentioned above, illustrates a process 1100 for evaluating participant contribution in a collaborative environment. More particularly, FIG. 11 illustrates a training phase. The process 1100 begins with step 1102, providing a collaborative application to a plurality of client devices, the collaborative application being instrumented with code for capturing user interaction during performance of a given workload. The plurality of client devices may be the same client devices as those used during a run-time phase for evaluating participant contribution, or may be different. In some cases, the users of the client devices during the training phase are experts.

In step 1104, indications of actions taken by users of the client devices during performance of the given workload are collected utilizing the collaborative applications running on the client devices. In step 1106, time co-occurrence of the actions taken by the users of the client devices during performance of the given workload is captured utilizing the collaborative applications running on the client devices.

A clue dependency graph is built in step 1108 by clustering the actions taken during performance of the given workload as tasks. The clue dependency graph may comprise nodes representing the tasks of the given workload and directed edges connecting the tasks of the given workload to one another. Each directed edge of the clue dependency graph may be associated with a pair of tasks of the given workload and having a weight representing obviousness of performing a second one of the pair of tasks given observation of performance of a first one of the pair of tasks.

A time dependency graph is generated in step 1110 utilizing the time co-occurrence of the actions captured during performance of the given workload. The time dependency graph may comprise nodes representing the tasks of the given workload and directed edges connecting the tasks of the given workload to one another, with each of the directed edges of the time dependency graph being associated with a pair of tasks of the given workload and having a weight representing a designated time window for performance of a second one of the pair of tasks subsequent to performance of a first one of the pair of tasks.

In step 1112, contribution scores are assigned to users of the client devices for performing the tasks of the given workload utilizing the clue dependency graph and the time dependency graph.

Embodiments may be used for a variety of different applications as described herein, including in next generation learning tools, early childhood education, AR-based education learning applications, etc. Examples of such applications have been described along with various advantages provided by some embodiments. It is to be appreciated, however, that embodiments may be used in various other applications and contexts and that certain embodiments may provide some, all or none of the specific advantages described herein with respect to specific applications such as collaborative learning.

Embodiments of the present invention can include be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 12:
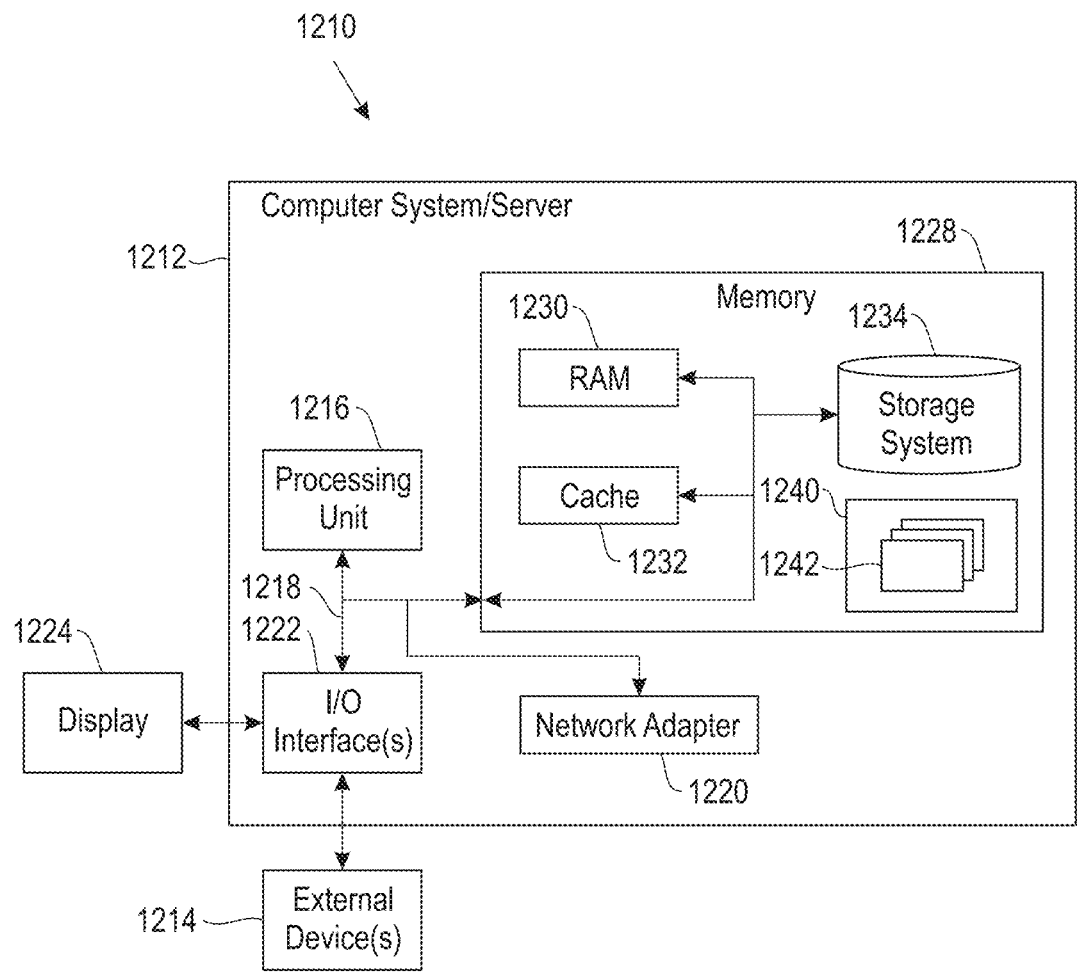
FIG. 12 depicts a computer system in accordance with which one or more components/steps of techniques of the invention may be implemented, according to an exemplary embodiment of the invention.

One or more embodiments can make use of software running on a general-purpose computer or workstation. With reference to FIG. 12, in a computing node 1210 there is a computer system/server 1212, which is operational with numerous other general purpose or special purpose computing system environments or configurations. Examples of well-known computing systems, environments, and/or configurations that may be suitable for use with computer system/server 1212 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1212 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1212 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 12, computer system/server 1212 in computing node 1210 is shown in the form of a general-purpose computing device. The components of computer system/server 1212 may include, but are not limited to, one or more processors or processing units 1216, a system memory 1228, and a bus 1218 that couples various system components including system memory 1228 to processor 1216.

The bus 1218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 1212 typically includes a variety of computer system readable media. Such media may be any available media that is accessible by computer system/server 1212, and it includes both volatile and non-volatile media, removable and no-removable media.

The system memory 1228 can include computer system readable media in the form of volatile memory, such as random access memory (RAM) 1230 and/or cache memory 1232. The computer system/server 1212 may further include other removable/non-removable, volatile/nonvolatile computer system storage media. By way of example only, storage system 1234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 1218 by one or more data media interfaces. As depicted and described herein, the memory 1228 may include at least one program product having a set (e.g., at least one) of program modules that are configured to carry out the functions of embodiments of the invention. A program/utility 1240, having a set (at least one) of program modules 1242, may be stored in memory 1228 by way of example, and not limitation, as well as an operating system, one or more application programs, other program modules, and program data. Each of the operating system, one or more application programs, other program modules, and program data or some combination thereof, may include an implementation of a networking environment. Program modules 1242 generally carry out the functions and/or methodologies of embodiments of the invention as described herein.

Computer system/server 1212 may also communicate with one or more external devices 1214 such as a keyboard, a pointing device, a display 1224, etc., one or more devices that enable a user to interact with computer system/server 1212, and/or any devices (e.g., network card, modem, etc.) that enable computer system/server 1212 to communicate with one or more other computing devices. Such communication can occur via I/O interfaces 1222. Still yet, computer system/server 1212 can communicate with one or more networks such as a LAN, a general WAN, and/or a public network (e.g., the Internet) via network adapter 1220. As depicted, network adapter 1220 communicates with the other components of computer system/server 1212 via bus 1218. It should be understood that although not shown, other hardware and/or software components could be used in conjunction with computer system/server 1212. Examples include, but are not limited to, microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 13:
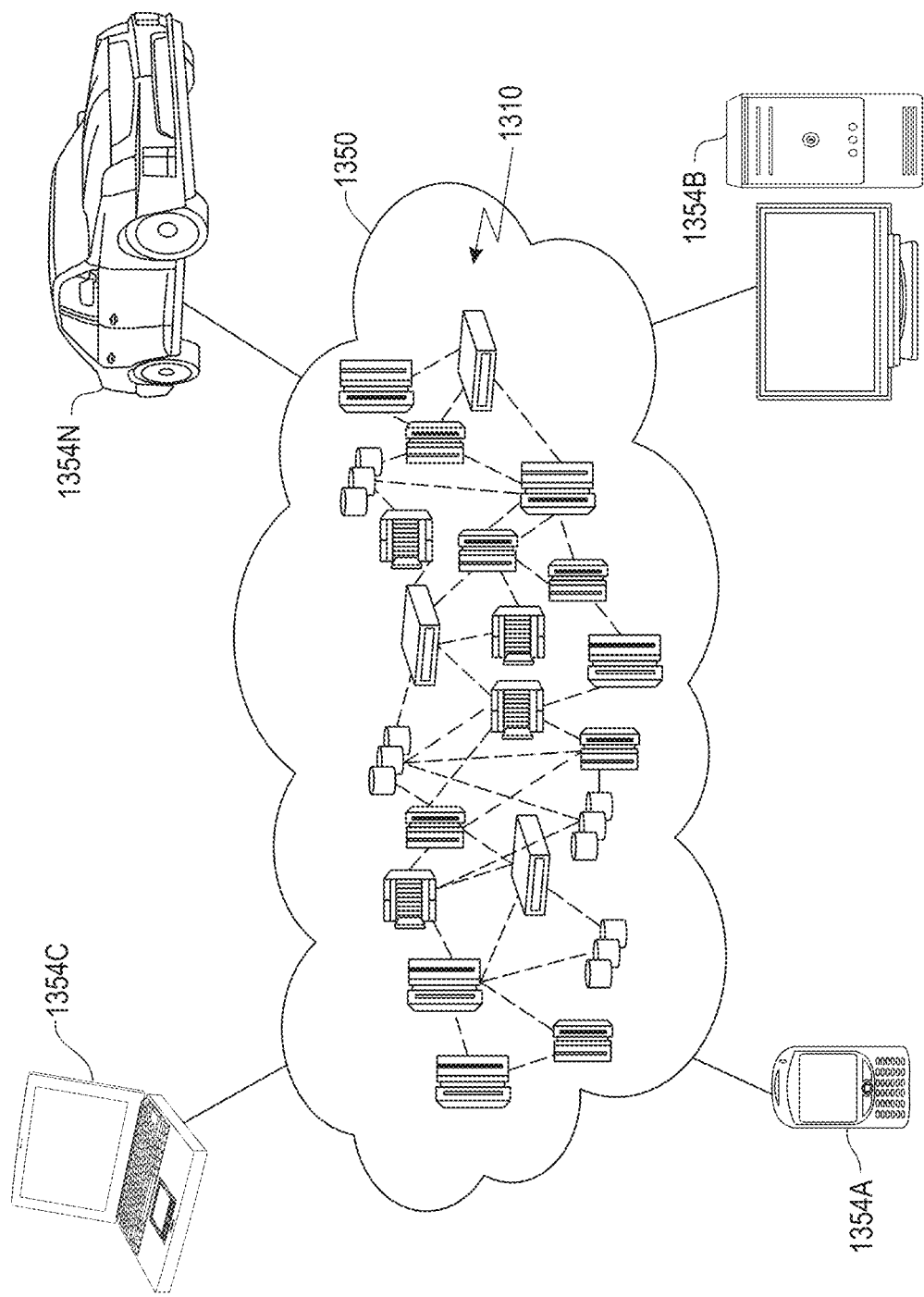
FIG. 13 depicts a cloud computing environment, according to an exemplary embodiment of the present invention.

Referring now to FIG. 13, illustrative cloud computing environment 1350 is depicted. As shown, cloud computing environment 1350 includes one or more cloud computing nodes 1310 with which local computing devices used by cloud consumers, such as, for example, personal digital assistant (PDA) or cellular telephone 1354A, desktop computer 1354B, laptop computer 1354C, and/or automobile computer system 1354N may communicate. Nodes 1310 may communicate with one another. They may be grouped (not shown) physically or virtually, in one or more networks, such as Private, Community, Public, or Hybrid clouds as described hereinabove, or a combination thereof. This allows cloud computing environment 1350 to offer infrastructure, platforms and/or software as services for which a cloud consumer does not need to maintain resources on a local computing device. It is understood that the types of computing devices 1354A-N shown in FIG. 13 are intended to be illustrative only and that computing nodes 1310 and cloud computing environment 1350 can communicate with any type of computerized device over any type of network and/or network addressable connection (e.g., using a web browser).

Figure 14:
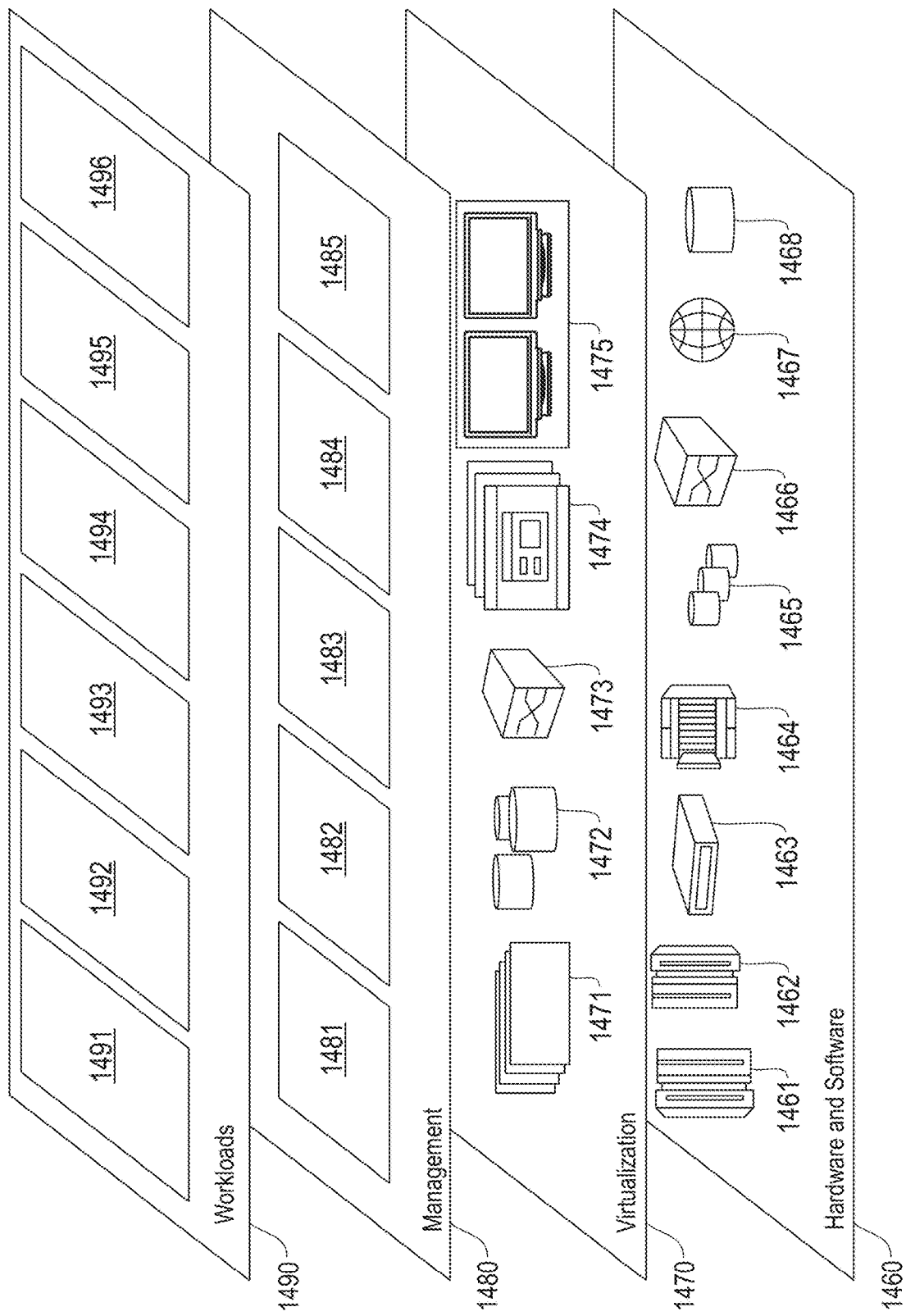
FIG. 14 depicts abstraction model layers, according to an exemplary embodiment of the present invention.

Referring now to FIG. 14, a set of functional abstraction layers provided by cloud computing environment 1350 (FIG. 13) is shown. It should be understood in advance that the components, layers, and functions shown in FIG. 14 are intended to be illustrative only and embodiments of the invention are not limited thereto. As depicted, the following layers and corresponding functions are provided:

Hardware and software layer 1460 includes hardware and software components. Examples of hardware components include: mainframes 1461; RISC (Reduced Instruction Set Computer) architecture based servers 1462; servers 1463; blade servers 1464; storage devices 1465; and networks and networking components 1466. In some embodiments, software components include network application server software 1467 and database software 1468.

Virtualization layer 1470 provides an abstraction layer from which the following examples of virtual entities may be provided: virtual servers 1471; virtual storage 1472; virtual networks 1473, including virtual private networks; virtual applications and operating systems 1474; and virtual clients 1475.

In one example, management layer 1480 may provide the functions described below. Resource provisioning 1481 provides dynamic procurement of computing resources and other resources that are utilized to perform tasks within the cloud computing environment. Metering and Pricing 1482 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1483 provides access to the cloud computing environment for consumers and system administrators. Service level management 1484 provides cloud computing resource allocation and management such that required service levels are met. Service Level Agreement (SLA) planning and fulfillment 1485 provide pre-arrangement for, and procurement of, cloud computing resources for which a future requirement is anticipated in accordance with an SLA.

Workloads layer 1490 provides examples of functionality for which the cloud computing environment may be utilized. Examples of workloads and functions which may be provided from this layer include: mapping and navigation 1491; software development and lifecycle management 1492; virtual classroom education delivery 1493; data analytics processing 1494; transaction processing 1495; and collaborative scoring processing 1496, which may perform various functions described above with respect to system 100.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
obtaining, from collaborative applications running on a plurality of client devices, indications of tasks of a given workload that have been completed by respective ones of the plurality of client devices;
identifying (i) a first task of the given workload completed by a first one of the plurality of client devices at a first time and (ii) a second task of the given workload completed by a second one of the plurality of client devices at a second time subsequent to the first time;
determining whether the first task provides a clue for completing the second task;
determining whether the second time is within a designated time window starting after the first time;
analyzing eye-gaze pattern information to determine whether a second user of the second client device observed a first user of the first client device performing the first task; and
modifying contribution scores for the first user and the second user related to the given workload responsive to determining: (i) that the first task provides a clue for completing the second task; (ii) that the second time is within the designated time window; and (iii) that the second user observed the first user performing the first task;
wherein the steps are carried out by at least one computing device.

2. The method of claim 1, wherein determining whether the first task provides a clue for the second comprises utilizing a clue dependency graph for the given workload, the clue dependency graph comprising nodes representing the tasks of the given workload and directed edges connecting the tasks of the given workload to one another.

3. The method of claim 2, wherein a given directed edge connecting the first task to the second task indicates that the first task provides a clue for execution of the second task, and wherein a weight assigned to the given directed edge represents obviousness of the clue.

4. The method of claim 1, wherein determining whether the second time is within the designated time window comprises utilizing a time dependency graph, the time dependency graph comprising nodes representing tasks and directed edges connecting the tasks of the given workload to one another.

5. The method of claim 4, wherein a given directed edge connecting the first task to the second task indicates that the second task is performed subsequent to the first task, and wherein a weight assigned to the given directed edge represents the designated time window.

6. The method of claim 1, comprising tracking user confusion state changes as the plurality of client devices perform the tasks of the given workload, wherein the user confusion state changes are utilized in determining whether the second user of the second client device observed the first user of the first client device performing the first task.

7. The method of claim 6, wherein tracking user confusion state changes comprises analyzing interaction patterns of users of the plurality of client devices.

8. The method of claim 6, wherein tracking user confusion state changes comprises analyzing facial expressions of users of the plurality of client devices.

9. The method of claim 1, comprising capturing the eye-gaze pattern information via respective image sensors or cameras of the plurality of client devices.

10. The method of claim 1, wherein modifying contribution scores for the first user and the second user related to the given workload comprises increasing a contribution score for the first user by a first designated amount and decreasing a contribution score for the second user by a second designated amount.

11. The method of claim 10, wherein at least one of the first designated amount and the second designated amount is based on obviousness of the clue for the second task provided by the first task.

12. The method of claim 10, wherein at least one of the first designated amount and the second designated amount is based on the length of time between performance of the first task and performance of the second task.

13. The method of claim 1, wherein actions taken by a user in one of the collaborative applications running on one of the plurality of client devices are real-time replicated in the collaborative applications running on other ones of the plurality of client devices.

14. The method of claim 1, wherein the plurality of client devices implement a collaborative learning environment, and the given workload comprises a problem to be completed by students utilizing the plurality of client devices.

15. The method of claim 1, wherein the plurality of client devices implement a collaborative support environment, and the given workload comprises a support ticket to be completed by support representatives utilizing the plurality of client devices.

16. A computer program product, the computer program product comprising a computer readable storage medium having program instructions embodied therewith, the program instructions executable by a device to cause the device to perform steps of:
    obtaining, from collaborative applications running on a plurality of client devices, indications of tasks of a given workload that have been completed by respective ones of the plurality of client devices;
    identifying (i) a first task of the given workload completed by a first one of the plurality of client devices at a first time and (ii) a second task of the given workload completed by a second one of the plurality of client devices at a second time subsequent to the first time;
    determining whether the first task provides a clue for completing the second task;
    determining whether the second time is within a designated time window starting after the first time;
    analyzing eye-gaze pattern information to determine whether a second user of the second client device observed a first user of the first client device performing the first task; and
    modifying contribution scores for the first user and the second user related to the given workload responsive to determining: (i) that the first task provides a clue for completing the second task; (ii) that the second time is within the designated time window; and (iii) that the second user observed the first user performing the first task.

17. The computer program product of claim 16, the program further causing the device to perform the step of tracking user confusion state changes as the plurality of client devices perform the tasks of the given workload, wherein the user confusion state changes are utilized in determining whether the second user of the second client device observed the first user of the first client device performing the first task.

18. A system comprising:
    a memory; and
    at least one processor coupled to the memory and configured for:
    obtaining, from collaborative applications running on a plurality of client devices, indications of tasks of a given workload that have been completed by respective ones of the plurality of client devices;
    identifying (i) a first task of the given workload completed by a first one of the plurality of client devices at a first time and (ii) a second task of the given workload completed by a second one of the plurality of client devices at a second time subsequent to the first time;
    determining whether the first task provides a clue for completing the second task;
    determining whether the second time is within a designated time window starting after the first time;
    analyzing eye-gaze pattern information to determine whether a second user of the second client device observed a first user of the first client device performing the first task; and
    modifying contribution scores for the first user and the second user related to the given workload responsive to determining: (i) that the first task provides a clue for completing the second task; (ii) that the second time is within the designated time window; and (iii) that the second user observed the first user performing the first task.

19. A computer-implemented method, comprising:
    providing a collaborative application to a plurality of client devices, the collaborative application being instrumented with code for capturing user interaction during performance of a given workload;
    collecting indications of actions taken by users of the client devices during performance of the given workload utilizing the collaborative application;
    capturing time co-occurrence of the actions taken by the users of the client devices during performance of the given workload utilizing the collaborative application;
    building a clue dependency graph by clustering the actions taken during performance of the given workload as tasks, the clue dependency graph comprising nodes representing the tasks of the given workload and directed edges connecting the tasks of the given workload to one another, each directed edge of the clue dependency graph being associated with a pair of tasks of the given workload and having a weight representing obviousness of performing a second one of the pair of tasks given observation of performance of a first one of the pair of tasks;
    generating a time dependency graph utilizing the time co-occurrence of the actions captured during performance of the given workload, the time dependency graph comprising nodes representing the tasks of the given workload and directed edges connecting the tasks of the given workload to one another, each of the directed edges of the time dependency graph being associated with a pair of tasks of the given workload and having a weight representing a designated time window for performance of a second one of the pair of tasks subsequent to performance of a first one of the pair of tasks; and assigning contribution scores to users of the client devices for performing the tasks of the given workload utilizing the clue dependency graph and the time dependency graph;

wherein the steps are carried out by at least one computing device.

20. The method of claim 19, wherein the collecting, capturing, building and generating steps are performed during a training phase wherein a first set of users utilize a first plurality of client devices to perform the given workload and wherein the assigning step is performed during a run-time phase wherein a second set of users utilize a second plurality of client devices to perform the given workload.

* * * * *